US011047020B2

(12) United States Patent
Fan et al.

(10) Patent No.: US 11,047,020 B2
(45) Date of Patent: Jun. 29, 2021

(54) METHOD FOR MAKING A HIGH STRENGTH MULTIPHASE STEEL

(71) Applicant: ArcelorMittal, Luxembourg (LU)

(72) Inventors: Dongwei Fan, East Chicago, IN (US); Hyun Jo Jun, East Chicago, IN (US); John A. Rotole, East Chicago, IN (US)

(73) Assignee: ARCELORMITTAL, Luxembourg (LU)

( * ) Notice: Subject to any disclaimer, the term of this patent is extended or adjusted under 35 U.S.C. 154(b) by 233 days.

(21) Appl. No.: 16/398,873

(22) Filed: Apr. 30, 2019

(65) Prior Publication Data

US 2019/0256942 A1   Aug. 22, 2019

Related U.S. Application Data

(62) Division of application No. 15/316,600, filed as application No. PCT/IB2015/000819 on Jun. 3, 2015, now Pat. No. 10,612,107.

(30) Foreign Application Priority Data

Jun. 6, 2014 (WO) .................. PCT/IB2014/000991

(51) Int. Cl.
*C21D 9/46* (2006.01)
*C21D 8/02* (2006.01)
(Continued)

(52) U.S. Cl.
CPC .............. *C21D 9/46* (2013.01); *B32B 15/013* (2013.01); *C21D 8/0205* (2013.01); *C21D 8/0226* (2013.01); *C21D 8/0236* (2013.01); *C21D 8/0273* (2013.01); *C21D 8/0278* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/22* (2013.01); *C22C 38/24* (2013.01); *C22C 38/26* (2013.01);
(Continued)

(58) Field of Classification Search
None
See application file for complete search history.

(56) References Cited

U.S. PATENT DOCUMENTS

| 6,811,624 | B2 | 11/2004 | Hoydick |
| 8,747,577 | B2 | 6/2014 | Yoshinaga et al. |
| 8,888,933 | B2 | 11/2014 | Hayashi et al. |
| 9,284,655 | B2 | 3/2016 | Kuhn et al. |
| 2010/0132848 | A1 | 6/2010 | Ikeda et al. |

(Continued)

FOREIGN PATENT DOCUMENTS

| CN | 102011053 A | 4/2011 |
| CN | 102918174 A1 | 2/2013 |

(Continued)

*Primary Examiner* — Colin W. Slifka
(74) *Attorney, Agent, or Firm* — Davidson, Davidson & Kappel, LLC

(57) ABSTRACT

A method for producing a cold rolled and hot dip coated steel sheet is provided. The method includes casting a steel into a slab, reheating, hot rolling, cooling, coiling, descaling and cold rolling the slab. The cold rolled steel sheet is annealed so a layer of iron oxide forms on the surface with an internal oxidation underneath. The sheet is then heated so the surface is oxidized and the layer of iron oxide is fully reduced to obtain an internally oxidized depth between 200 nm and 100 μm which includes one or more of Si, Mn, Al, Ti containing oxides. The sheet is then hot dip coated and cooled.

21 Claims, 1 Drawing Sheet

(51) Int. Cl.

| | |
|---|---|
| C23C 2/02 | (2006.01) |
| C23C 2/06 | (2006.01) |
| C22C 38/00 | (2006.01) |
| C22C 38/02 | (2006.01) |
| C22C 38/06 | (2006.01) |
| C22C 38/26 | (2006.01) |
| C22C 38/28 | (2006.01) |
| C22C 38/32 | (2006.01) |
| C22C 38/38 | (2006.01) |
| C22C 38/22 | (2006.01) |
| C23C 2/40 | (2006.01) |
| B32B 15/01 | (2006.01) |
| C22C 38/04 | (2006.01) |
| C22C 38/08 | (2006.01) |
| C22C 38/12 | (2006.01) |
| C22C 38/14 | (2006.01) |
| C23C 2/12 | (2006.01) |
| C22C 38/24 | (2006.01) |
| C23C 2/28 | (2006.01) |

(52) U.S. Cl.
CPC .............. *C22C 38/28* (2013.01); *C22C 38/32* (2013.01); *C22C 38/38* (2013.01); *C23C 2/02* (2013.01); *C23C 2/06* (2013.01); *C23C 2/12* (2013.01); *C23C 2/28* (2013.01); *C23C 2/40* (2013.01); *C21D 8/0263* (2013.01); *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2010/0186854 A1 | 7/2010 | Bertrand et al. |
| 2011/0008570 A1 | 1/2011 | Seth et al. |
| 2013/0008570 A1 | 1/2013 | Ikeda et al. |
| 2013/0071687 A1 | 3/2013 | Takagi et al. |
| 2014/0170439 A1 | 6/2014 | Allain et al. |
| 2014/0234657 A1 | 8/2014 | Azuma et al. |
| 2014/0234658 A1 | 8/2014 | Nozaki et al. |
| 2014/0251505 A1 | 9/2014 | Blumenau et al. |
| 2015/0000797 A1 | 1/2015 | Sebald et al. |

FOREIGN PATENT DOCUMENTS

| | | |
|---|---|---|
| DE | 102011051731 A1 | 1/2013 |
| EP | 1637618 A1 | 3/2006 |
| EP | 2256224 A1 | 12/2010 |
| EP | 2426230 A1 | 3/2012 |
| EP | 2578718 A1 | 10/2013 |
| EP | 2684975 A1 | 1/2014 |
| GB | 2493302 A | 1/2013 |
| JP | 2000109965 A | 4/2000 |
| JP | 2003342644 A | 12/2003 |
| JP | 2005105367 A | 4/2005 |
| JP | 2007231373 A | 9/2007 |
| JP | 2009242816 A | 10/2009 |
| JP | 2010070843 A | 4/2010 |
| JP | 2010132975 A | 6/2010 |
| JP | 5376090 B2 | 12/2013 |
| RU | 2294385 C2 | 2/2007 |
| RU | 2416671 C2 | 4/2011 |
| RU | 2485202 C1 | 6/2013 |
| RU | 2496887 C1 | 10/2013 |
| WO | 2012091310 A2 | 7/2012 |
| WO | 2012153016 | 11/2015 |

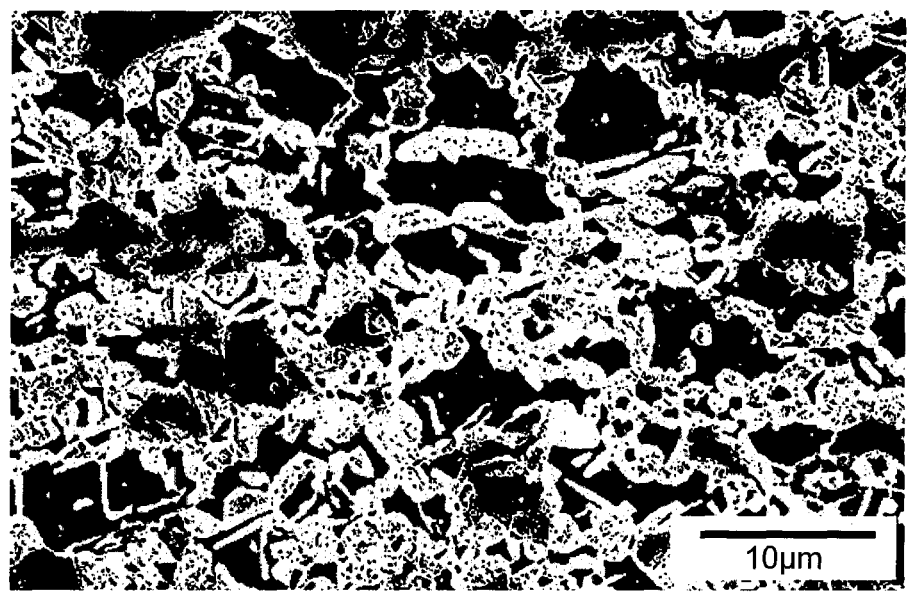

METHOD FOR MAKING A HIGH STRENGTH MULTIPHASE STEEL

This is a Divisional of U.S. patent application Ser. No. 15/316,600, filed Dec. 6, 2016 and now U.S. Pat. No. 10,612,107, which is a National Phase of International Patent Application PCT/IB2015/000819, filed Jun. 3, 2015 which claims priority to International Patent Application PCT/IB2014/000991, filed Jun. 6, 2014; all of which are hereby incorporated by reference herein.

The present invention relates to high-strength multiphase steels, for motor vehicles use, which have high formability properties and exhibit high resistance levels, and are intended to be used as structural members and reinforcing materials primarily for motor vehicles. It also provides a method of producing the high formability multiphase steel.

BACKGROUND

As the use of high strength steels increases in automotive applications, there is a growing demand for steels of increased strength without sacrificing formability. Growing demands for weight saving and safety requirement motivate intensive elaborations of new concepts of automotive steels that can achieve higher ductility simultaneously with higher strength in comparison with the existing Advanced High Strength Steels (AHSS).

Thus, several families of steels like the ones mentioned below offering various strength levels have been proposed.

Among those concepts, steels with micro-alloying elements whose hardening is obtained simultaneously by precipitation and by refinement of the grain size have been developed. The development of such High Strength Low Alloyed (HSLA) steels has been followed by those of higher strength called Advanced High Strength Steels which keep good levels of strength together with good cold formability. However, the tensile levels reached by these grades are generally low.

So as to answer to the demand of steels with high resistance and at the same time high formability, a lot of developments took place. However, it is well known that for high strength steels, trying to increase the ultimate tensile strength generally leads to lower ductility levels. Nevertheless, carmakers keep developing more and more complex parts that require more ductility without sacrificing the resistance requirements. In addition, an improvement in yield strength and hole expansion performance over steels currently in production is needed, for instance for hot dip coated steel sheets.

The US application US2013008570 is known, such application deals with an ultra high strength steel plate with at least 1100 MPa of tensile strength that has both an excellent strength-stretch balance and excellent bending workability, and a method for producing the same. The metal structure of the steel plate has martensite, and the soft phases of bainitic ferrite and polygonal ferrite. The area of the aforementioned martensite constitutes 50% or more, the area of the aforementioned bainitic ferrite constitutes 15% or more, and the area of the aforementioned polygonal ferrite constitutes 5% or less (including 0%). When the circle-equivalent diameter of the aforementioned soft phase is measured, the coefficient of variation (standard deviation/mean value) is less or equal to 1.0. The ultra high strength steel plate has at least 1100 MPa of tensile strength. Such application is silent as regards to different formability issues such as hole expansion and yield strength which have important impact on in use properties.

It is also known the application WO2012153016, dealing with a cold rolled steel which tensile strength is above 1000 MPa and uniform elongation above 12%, as well as V bendability above 90°. The chemical composition of this application comprises, in weight percent: $0.15\% \leq C \leq 0.25\%$, $1.8\% \leq Mn \leq 3.0\%$, $1.2\% \leq Si \leq 2\%$, $0\% \leq Al \leq 0.10\%$, $0\% \leq Cr \leq 0.50\%$, $0\% \leq Cu \leq 1\%$, $0\% \leq Ni \leq 1\%$, $0\% \leq S \leq 0.005\%$, $0\% \leq P \leq 0.020\%$, $Nb \leq 0.015\%$, $Ti \leq 0.020\%$, $V \leq 0.015\%$, $Co \leq 1\%$, $N \leq 0.008\%$, $B \leq 0.001\%$ while $Mn+Ni+Cu \leq 3\%$, the remainder being Fe and inevitable impurities from the cast. The steel microstructure contains, in surface percentage, 5 to 20% of polygonal ferrite, between 10 and 15% of residual austenite, from 5 to 15% of martensite, balance being lath type bainite. This application requires austenite to be stabilized through the continuous annealing process.

BRIEF SUMMARY OF THE INVENTION

The invention is directed to a method of manufacturing high strength hot dip coated steel, its production method and the use of said high strength steel to produce a part of a vehicle.

Objects of the invention are to solve above mentioned problems, i.e. bringing a hot dip coated high strength steel with simultaneously:

a tensile strength above or equal to 980 MPa, or even 1180 MPa;

a total elongation above or equal to 8%;

a hole-expansion value superior or equal to 20%, or even 40%; and a yield strength value above 500 MPa, or even 780 MPa The present invention provides a process for making such hot dip coated multiphase steel, while being compatible with usual continuous annealing galvanizing lines.

The invention present invention further provides a hot dip coated steel sheet with tensile strength of at least 980 MPa, with yield strength above or equal to 500 MPa, with total elongation above or equal to 8%, the composition of which consists, by weight percent:

$0.05 \leq C \leq 0.15\%$;
$2 \leq Mn \leq 3\%$;
$Al \leq 0.1\%$;
$0.3 \leq Si \leq 1.5\%$;
$0.01\% \leq Nb \leq 0.05\%$;
$N \leq 0.02\%$;
$0.1 \leq Cr+Mo \leq 1\%$;
$0.0001 \leq B < 0.0025\%$;
$Ti \leq 0.5\%$;
$V < 0.01\%$;
$S \leq 0.01\%$; and
$P \leq 0.05\%$;

the remainder of the composition being iron and unavoidable impurities resulting from the smelting and the microstructure consists of, in surface fraction: between 50 and 95% of martensite and between 5 and 50% of the sum of ferrite and bainite, wherein the ferrite grain size is below 10 μm, and wherein the aspect ratio of the ferrite grain size is between 1 and 3.

In a preferred embodiment, the steel chemical composition has a carbon content such that, $0.09 \leq C \leq 0.14\%$.

In another preferred embodiment, the steel has a manganese content such that, $2.2 \leq Mn \leq 2.7\%$.

In another preferred embodiment, the steel has an aluminum content such that $Al \leq 0.05\%$.

In another preferred embodiment, the steel has silicon content such that $0.6 \leq Si \leq 1.3\%$.

In another preferred embodiment, the steel chemical composition has a niobium content such that, Nb≤0.03%.

In another preferred embodiment, the steel chemical composition has a sum of chromium and molybdenum such that, 0.1≤Cr+Mo≤0.7%.

In another preferred embodiment, the steel chemical composition has a boron content such that, 0.001≤B≤0.0022%.

In another preferred embodiment, the steel chemical composition has a titanium content such that: 0.02%≤Ti≤0.05%.

In another preferred embodiment, the steel sheet has an internally oxidized depth of at least 200 nm and of less than 100 µm, comprising one or more of Si, Mn, Al, Ti containing oxides, present under the hot dip coating.

In a preferred embodiment, the surface fraction of the sum of ferrite and bainite is between 20 and 40%, with the mean ferrite grain size below 3 µm.

Preferably, the hot dip coated steel of the invention has the tensile strength is at least 980 MPa, the yield strength is at least 500 MPa, total elongation is at least 8% and the hole expansion is at least 20%.

Preferably, the hot dip coated steel of the invention has a tensile strength of at least 1180 MPa, a yield strength of at least 780 MPa, a total elongation of at least 8% and a hole expansion of at least 20%.

Preferably, the steel according to the invention is galvanized or galvannealed.

The present invention provides a method for producing a high strength steel hot dip coated sheet comprising the successive following steps:

casting a steel which composition is according to the invention as defined above so as to obtain a slab, reheating the slab at a temperature $T_{reheat}$ above 1180° C., hot rolling the reheated slab at a temperature above 800° C. to obtain a hot rolled steel, cooling the hot rolled steel at conventional cooling rate until a coiling temperature $T_{coiling}$ between 500 and 800° C., then coiling the hot rolled steel cooled at $T_{coiling}$, de-scaling the hot rolled steel, Optionally, the hot rolled steel is annealed at a temperature $T_{IA}$ above 300° C. during more than 20 minutes, Optionally, the temperature of the hot rolled steel before entering the cover should be above 400° C. The cooling rate of the hot rolled steel should be lower than or equal to 1° C./min and higher than or equal to 0.01° C./min, cold rolling the steel so as to obtain a cold rolled steel sheet, annealing the cold rolled steel sheet comprising the steps of:

heating said cold rolled steel sheet in a direct fire furnace having an atmosphere with an excess oxygen volume percentage comprised between 0.2% and 4%, wherein an oxidizing step takes place between 500° C. and 750° C., heating up from said direct fire furnace temperature up to an annealing temperature in a radiation tube furnace, the heating rate being comprised between 0.5 and 2.5° C./s, the dew point of the atmosphere in said radiation tube furnace being below or equal to 25° C., said annealing temperature $T_{anneal}$ being comprised between 750 to 950° C., maintaining the steel at said annealing temperature $T_{anneal}$ for a duration of at least 30 seconds and less than or equal to 300 seconds, cooling the cold rolled steel to a temperature $T_{OA}$ between 440° C. and 470° C., Holding the cold rolled steel at $T_{OA}$ for more than 30 seconds and less than 180 seconds, and during said heating, maintaining at $T_{anneal}$ and cooling steps, the surface of the cold rolled steel is oxidized and subsequently reduced so as to obtain an internally oxidized depth of at least 200 nm and of less than 100 µm, comprising one or more of Si, Mn, Al, Ti containing oxides, hot dip coating the cold rolled steel to obtain coated cold rolled steel, optionally, the hot dip coated cold rolled steel is galvannealed to reach an iron content between 7% and 15% in the cold rolled steel coating.

the hot dip coated cold rolled steel is cooled down to room temperature at a cooling rate of at least 1° C./s.

Preferably, the coiling temperature is so that: 500° C.≤$T_{coiling}$≤750° C.

In a preferred embodiment, the optional annealing temperature $T_{IA}$ is so that 500° C.≤$T_{IA}$≤650° C. for a time between 30 hours and 100 hours.

Preferably, the cold rolling reduction ratio is comprised between 40 and 60%.

In a preferred embodiment, the surface of the cold rolled steel is reduced within said radiant tube furnace having a mixed gas atmosphere having a dew point below 0° C.

Preferably, the hot dip coating is done in a liquid Zn alloyed bath so as to obtain a galvanized or galvannealed cold rolled hot dip high strength steel.

The steel according to the invention can be used to produce a part for a motor vehicle.

BRIEF DESCRIPTION OF THE DRAWING

The main aspects of the invention will now be described:

FIG. 1 illustrates a microstructure of the steel according to the invention with martensite in white, ferrite and bainite in black.

DETAILED DESCRIPTION

To obtain the steel of the invention, the chemical composition is very important as well as the production parameters so as to reach all the objectives. Following chemical composition elements are given in weight percent.

Carbon is an element used for strengthening the martensite, if the carbon content is below 0.05%, the tensile strength of 980 MPa minimum is not reached in the present invention. If carbon is higher than 0.15%, the martensite will be hard and the total elongation of 8% will not be reached in the steel of the present invention. Furthermore, carbon is strong austenite forming element. Lowering carbon contents, from 0.15% downwards, allows having for a given annealing temperature, less austenite and enough ferrite to improve formability and reach the total elongation target. Additionally, low annealing temperatures for the steel according to the invention limits considerably ferrite grain growth; as a consequence, the final ferritic grain size is below 10 microns. This combination contributes to the great compromise of mechanical properties obtained in the steel according to the invention.

Preferably, the carbon content is so that 0.09≤C≤0.14%.

Manganese is a hardening element. If Mn content is below 2%, the tensile strength will be lower than 980 MPa. If the Mn content is above 3%, central segregation of Mn is expected at mid thickness and this will be detrimental to In Use Properties. Preferably, the manganese content is so that 2.2≤Mn≤2.7%.

Silicon has a strengthening effect, it improves total elongation and hole expansion ratio as well as delayed fracture resistance. If Si content is below 0.3%, total elongation will be below 8% and above mentioned properties will be impaired. If Si content is above 1.5%, the rolling loads increase too much and cold rolling process becomes difficult. Furthermore the soaking temperature will be too high, this will lead to manufacturability issues. Moreover, coatability by hot dip coating may get impaired due to silicon oxide formation on surface of the sheet. Preferably, the Si content is so that $0.6 \leq Si \leq 1.3$ for above given reasons.

Aluminum, just like titanium, can form AlN to protect boron. However, its content is limited to 0.1% because higher Al contents, will lead to higher annealing temperatures to have the same microstructural balance all other parameters being equal. Consequently, for cost and energy saving purposes, its content is limited to 0.1%. Preferably, the Al content is so that $Al \leq 0.05\%$.

Niobium can form precipitates, which have a grain refining effect, known to increase tensile strength. In addition it improves hole expansion ratio as well as delayed fracture resistance. If Nb content is above 0.05%, ductility will be reduced and the total elongation will fall below 8%. Nb content has to be above 0.01% in order to obtain sufficient grain refinement and tensile strength. Preferably, the Nb content is so that $Nb \leq 0.03\%$.

Mo and Cr will improve hardenability and tensile strength. If the sum of these elements is below 0.1%, a large fraction of ferrite will form in addition to the growth of pro-eutectoïd ferrite grain formed during annealing and this will decrease the strength. If the sum of these elements is above 1% in the steel of the invention, it will make the hot band hard and difficult to cold roll. Preferably the sum of these elements is so that $0.1 \leq Cr+Mo \leq 0.7\%$.

Titanium is added to combine with nitrogen so as to form TiN and as a consequence protect B in solid solution, if neither Ti nor Al is present, boron nitride can form. In that case, boron would not be in solid solution and play its role defined below. Additionally TiN formation improves the formability and the weldability as well as the resistance to Delayed fracture in the steel of the invention. Above 0.5%, Ti will lead to higher annealing temperatures to have the same microstructural balance all other parameters being equal. Consequently, for cost and energy saving purposes, its content is preferably limited to 0.05%. Preferably, the Ti content is so that $0.02 \leq Ti \leq 0.05\%$. In a preferred embodiment, Ti content is at least 3.4 times the nitrogen content, so as to ensure its combination with nitrogen and to obtain efficient grain refinement.

Boron can suppress ferrite formation during the cooling step of the cold rolled band annealing. As a result, it avoids a drop in strength below 980 MPa. If the boron content is above or equal 0.0025% (25 ppm), the excess of boron will precipitate as nitride boron at austenitic grain boundaries and these will serve as nucleation sites for ferrite formation with the same tensile drop effect on mechanical properties. Below 0.0001% (1 ppm) higher grades it terms of tensile strength are more difficult to reach. Ideally, boron must be $0.001 \leq B \leq 0.0022\%$ to obtain mechanical properties above 1180 MPa with a minimum of 8% of total elongation.

As for vanadium, if the content is above 0.01%, vanadium will consume the carbon by forming carbides and/or nitrocarbides and this will soften the martensite. In addition, the ductility of the steel according to the invention will be impaired and fall below 8%.

As for nitrogen, if the nitrogen content is above 0.02%, boron nitrides will form and reduce the steel hardenability since low content of free boron will be available. It will also form large fraction of AlN, which is detrimental for total elongation and hole expansion ratio. Consequently, nitrogen content is limited to 0.02% not to fall below 8% of elongation and/or 20% of hole expansion ratio.

As for phosphorus, at contents over 0.050 wt. %, phosphorus segregates along grain boundaries of steel and causes the deterioration of delayed fracture resistance and weldability of the steel sheet. The phosphorus content should therefore be limited to 0.050 wt. %.

As for sulphur, contents over 0.01 wt % lead to a large amount of non-metallic inclusions (MnS), and this causes the deterioration of delayed fracture resistance and ductility of the steel sheet. Consequently, the sulphur content should be limited to 0.01 wt %.

The balance of the steel according to the invention is made of iron and unavoidable impurities.

The method to produce the steel according to the invention implies casting steel with to chemical composition of the invention.

The cast steel is reheated above 1180° C. When slab reheating temperature is below 1180° C., the steel will not be homogeneous and precipitates will not be completely dissolved.

Then the slab is hot rolled, the last hot rolling pass taking place at a temperature $T_{lp}$ of at least of 800° C. If $T_{lp}$ is below 800° C., hot workability is reduced and cracks will appear and the rolling forces will increase.

Cooling the steel at a typical cooling rate known per se by man skilled in the art down to the coiling temperature $T_{coiling}$.

$T_{coiling}$ must be lower than the last pass temperature $T_{lp}$ ° C. This temperature is preferably below 800° C. preferably, the coiling temperature is so that 500° C. $\leq T_{coiling} \leq$ 750° C.

After coiling, the hot rolled steel is de-scaled.

Then, optionally, the hot rolled steel is annealed at a temperature above 300° C. during more than 20 minutes. If the thermal treatment is done below 300° C., the forces for cold rolling will be too high and below 20 minutes the same result is obtained, the material will be too hard to be easily cold rolled. Furthermore, the inventors have discovered that this thermal intermediate treatment greatly improves the sheet thickness homogeneity in a surprising manner. Preferably, the thermal treatment is done between 500° C. and 650° C. for 30 hours to 100 hours.

Optionally, the hot rolled steel is placed under a cover, insulated if necessary, to cover one or more coils to facilitate uniform cooling of the hot rolled product. Furthermore, the inventors have discovered that this cover treatment can also improves the sheet thickness homogeneity.

In a preferred embodiment, the temperature of the hot rolled steel before entering the cover should be above 400° C. The cooling rate of the steel should be lower than or equal to 1° C./min and higher than or equal to 0.01° C./min. If the cooling rate is higher than 1° C./min, the hot band will be too hard for following cold rolling. A cooling rate lower than 0.01° C./min, would be detrimental to productivity.

Cold rolling the steel with a cold rolling ratio that will depend on final targeted thickness. The cold rolling ratio is defined by: (thickness before cold rolling)−(thickness after cold rolling)/(thickness before cold rolling). Preferably the cold reduction ratio is comprised between 40 and 60%. Thus, the stored strain energy is adequate so as to ensure further recrystallization during annealing.

Heating the steel up to the annealing temperature $T_{anneal}$ which must be between 750° C. and 950° C.

The cold rolled steel sheet is further continuously annealed in order to obtain recrystallization and to obtain desired microstructure by transformation. The annealing comprises the following steps:

The cold rolled sheet is heated in a direct fire furnace (or "DFF") within an atmosphere having an excess volume oxygen percentage between 0.2% and 4%. Excess oxygen volume refers to the oxygen that is present in excess of the necessary oxygen quantity to combine with the fuel used to heat the furnace, i.e.: Excess Volume Oxygen percentage= (Total oxygen volume−oxygen volume needed for combustion)/(total oxygen volume). Thus, when excess oxygen is present in the combustion atmosphere within the proportion of the invention, it is available to react with the steel strip. In the range between 500 and 750° C., oxidation takes place, i.e. a layer of iron oxide is formed on the surface of the steel sheet while an internal oxidation occurs under this iron oxide: internal oxides within a depth of 100 µm, which can contain one or more of Si, Mn, Al, Ti, are thus created. If the oxidation depth is above 100 µm, the steel surface will be heavily oxidized, which will be difficult to be reduced, and coating quality will be deteriorated.

The steel sheet is further heated up from this oxidation temperature range up to an annealing temperature $T_{anneal}$, in a radiation tube furnace, the heating rate being comprised between 0.5 and 2.5° C./s. If the heating rate is below 0.5° C./s, excessive grain growth will reduce the final yield strength. If the heating rate is above 2.5° C./s, too much energy will be consumed.

The atmosphere in the radiant tube furnace, is a mixed gas atmosphere having a dew point below 25° C. Higher than 25° C. will cause excessive steel surface oxidation, which may impact the coating quality.

In a preferred embodiment, the dew point is below 0° C. so obtain very good surface quality.

The steel is further continuously annealed in the radiation tube furnace, under the same atmosphere conditions, at the temperature $T_{anneal}$ between 750° C. and 950° C. and maintained at this temperature during 30 to 300 seconds. Controlling the annealing temperature is an important feature of the process since it enables to control the initial austenite and ferrite fractions as well as their chemical composition. Below 750° C., the ferrite will not be fully recrystallized and elongation will be below 8%, while it is useless to go above 950° C. for energy and cost saving reasons. Preferably, the annealing is done at a temperature between 775 and 860° C.

The steel sheet is then further cooled down to a temperature $T_{OA}$.

During this heating, annealing and cooling steps, the steel is oxidized and then reduced, i.e. that the iron oxide layer at the surface of the steel sheet, mentioned above, is fully reduced, while an internal oxidized zone, with a depth between 200 nm and 100 µm, comprising one or more of Si, Mn, Al, Ti containing oxides, is present. This oxidation followed by reduction step is necessary so that the steel surface is suitable for hot dip coating.

After the cooling, the steel is held at a temperature between 440° C. to 470° C. for more than 30 s and less than 180 seconds. Below 440° C., a large fraction of bainite or martensite will be formed and whether the tensile strength whether the total elongation will be below the expectations of the present invention: 980 MPa and 8% respectively. Above 470° C., hot dipping issues will appear with vaporization of the melt and the reaction between melt and strip will be uncontrolled.

Then the steel is hot dip coated to obtain a coated cold rolled steel, preferably the hot dip coating is done in a bath of Zn or Zn alloy so as to obtain a galvanized cold rolled high strength steel.

Optionally, the hot dip coated cold rolled steel is alloyed to the substrate so as to obtain a galvannealed cold rolled high strength steel, the Zn or Zn alloy coating containing between 7 to 15% of iron.

The internal oxidized zone is present under the Zn or Zn alloy coating.

Then the hot dip coated cold rolled steel is cooled down to room temperature at a cooling rate of at least 1° C.s.

Ferrite in the frame of the present invention is defined by a cubic centre structure with grain size lower than 10 microns (µm). The sum of the content of ferrite and bainite, in the frame of the invention, must be between 5 and 50% so as to have at least 8% of total elongation; when the sum of ferrite and bainite is below 5%, such elongation level will not be reached. Above 50% of the sum of ferrite and bainite, the tensile strength target of 980 MPa will not be reached. Preferably, the sum of ferrite and bainite content is between 5 and 30%. In another embodiment, the sum of ferrite and bainite content is between 20 to 40%.

In a preferred embodiment, the ferrite grain size is below 10 µm, preferably, it is below 5 µm and even more preferably it is below 3 µm. The low grain size ferrite, i.e below 10 µm, improves the yield strength. This ferrite content range with limited size is obtained thanks to the combination of low annealing temperatures, chemical composition elements such as Nb and Ti which pin ferritic grain sizes and limit their growth as well as the presence of Cr and Mo which limit ferrite formation upon cooling after the annealing. Above 10 µm, the yield strength will be too low and below the target of 500 MPa.

In an preferred embodiment, the aspect ratio of the ferrite grain size, i.e the mean values of the ratios of the length by the height of each ferrite grain is between 1 and 3. Such measures are taken on at least 3 populations of ferrite grains, samples analyzed being observed with an optical or a scanning electronic microscope at the material third thickness for homogeneity purpose. This aspect ratio of ferrite grain size improves the homogeneity of properties, if ferrite grain size are needle types, i.e above 3 or below 1, the difference of properties between longitudinal direction and transversal direction will be too high and the material properties will be heterogeneous and too much depending on direction of strain.

Martensite is the structure formed during cooling after the soaking from the unstable austenite formed during annealing. Its content must be within the range of 50 to 95%. Less than 50% the tensile strength target of 980 MPa is not reached and above 95%, the total elongation will be below 8%.

The good hole expansion results in this invention is due to the phase fraction balance and small difference in hardness of the phases (ferrite and martensite).

Abbreviations

UTS (MPa) refers to the ultimate tensile strength measured by tensile test in the transversal direction relative to the rolling direction.

YS (MPa) refers to the yield strength measured by tensile test in the transversal direction relative to the rolling direction, TEl (%) refers to the total elongation.

UTS, YS and Tel can be measured following several tests. Tests used for the examples are done according to JIS-T standard.

HE (%) refers to the hole expansion. Such test can be performed with the help of a conical punch made of a cylindrical part which diameter is 45 mm, topped by a conical part. Such punch is being positioned under the steel sheet to test and which has been previously provided with a hole of an initial diameter Do of 10 mm. The conical punch is then being moved upwards into such hole and does enlarge it until a first traversing crack appears. The final diameter D of the hole is then being measured and the hole expansion is calculated using the following relationship:

$$HE = \left(\frac{D - Do}{Do}\right) \times 100$$

Microstructures were observed using a SEM at the quarter thickness location, using 2% Nital etching and quantified by image analysis.

The steels according to the invention will be better understood when reading the examples below which are given not for limitation purpose as regard to the scope but as illustrations.

Semi-finished products have been produced from steel casting. The chemical compositions of the semi-finished products, expressed in weight percent, are shown in Table 1 below.

TABLE 1 chemical composition of steels (wt %)

| STEEL | C | Mn | Si | Nb | Ti | Cr + Mo | B | Al | P | S | N | V |
|---|---|---|---|---|---|---|---|---|---|---|---|---|
| 1 | 0.12 | 2.3 | 0.3 | 0.015 | 0.025 | 0.6 | 0.0010 | 0.03 | 0.011 | 0.003 | 0.008 | <0.01 |
| 2 | 0.12 | 2.3 | 0.7 | 0.015 | 0.025 | 0.6 | 0.0010 | 0.04 | 0.010 | 0.003 | 0.007 | <0.01 |
| 3 | 0.12 | 2.3 | 1.2 | 0.016 | 0.026 | 0.5 | 0.0013 | 0.04 | 0.012 | 0.003 | 0.008 | <0.01 |
| 4 | 0.12 | 2.7 | 0.7 | 0.01 | <0.01 | 0.2 | <0.001 | 0.04 | 0.009 | 0.002 | 0.005 | <0.01 |
| 5 | 0.14 | 2.5 | 0.7 | 0.01 | <0.01 | 0.2 | <0.001 | 0.04 | 0.010 | 0.002 | 0.006 | <0.01 |
| 6 | 0.12 | 2.7 | 0.7 | 0.01 | 0.028 | 0.1 | 0.0021 | 0.04 | 0.009 | 0.002 | 0.005 | <0.01 |
| 7 | 0.12 | 2.7 | 1.2 | 0.01 | <0.01 | 0.1 | <0.001 | 0.04 | 0.010 | 0.002 | 0.005 | <0.01 |
| 8 | 0.12 | 2.7 | 0.7 | 0.01 | 0.02 | 0.3 | 0.0019 | 0.05 | 0.010 | 0.002 | 0.005 | <0.01 |
| 9 | 0.13 | 2.5 | 0.7 | 0.01 | 0.03 | 0.3 | 0.0020 | 0.05 | 0.010 | 0.002 | 0.008 | <0.01 |
| 10 | 0.13 | 2.7 | 0.7 | 0.01 | 0.03 | 0.3 | 0.0020 | 0.06 | 0.020 | 0.002 | 0.009 | <0.01 |
| 11 | 0.14 | 2.7 | 0.7 | 0.01 | 0.03 | 0.3 | 0.0020 | 0.05 | 0.020 | 0.002 | 0.010 | <0.01 |
| 12 | 0.09 | 2.2 | 0.3 | 0.015 | 0.03 | 0.5 | 0.0015 | 0.05 | 0.010 | 0.002 | 0.007 | <0.01 |
| 13 | 0.09 | _1.8_ | 0.3 | 0.002 | <0.01 | 0.3 | _<0.001_ | 0.05 | 0.010 | 0.002 | 0.007 | <0.01 |
| 14 | _0.2_ | 2.2 | _>1.5_ | 0.015 | <0.01 | 0.15 | _<0.001_ | _>0.1_ | 0.010 | 0.002 | 0.007 | <0.01 |

Underlined values: outside of the invention

The rest of the steel composition in Table 1 consists of iron and inevitable impurities resulting from the melting, impurity level being lower than 0.0005 but higher than 0.0001 mill. %.

Ingots of composition 1 to 14 were initially reheated and hot rolled. The hot rolled steel plates were then cold rolled and annealed. The process parameters undergone are shown hereunder:
Reheating temperature (HR reheat), ° C.,
Finishing rolling temperature (HRFT): ° C.,
Coiling temperature (CT): ° C.,
Intermediate annealing temperature (IA T): ° C. and time (IA t): hr,
Hot band slowing cooling, entry temperature (° C.) to the cover, and cooling rate (° C./min),
Cold rolling applied (CR),
Oxidation temperature in direction fire furnace (DFF temperature): ° C.,
The excess oxygen volume percentage in DFF,
The heating rate before reach annealing temperature (° C./s),
The dew point in annealing furnace (° C.),
Soaking temperature during annealing (AT): ° C.,
Soaking duration during annealing (At): s,
Over-ageing temperature range OAT,
Over-ageing time Oat,
Coating type: GI for galvanized at 465° C. and GA for Galvannealed with varied temperature.

The steels 1 to 14 have undergone the process parameters described in table 2.

TABLE 2 process parameters from reheating to cold rolling

| Steel Number | Fabrication condition | HR, reheat, (° C.) | HR FT, (° C.) | CT, (° C.) | IA T, (° C.) | IA t, (hr) | cover | Cover entry temperature, ° C. | cooling rate, (° C./min) | CR |
|---|---|---|---|---|---|---|---|---|---|---|
| 1 | A, I, O, V | 1230 | 871 | 620 | No | | No | | | 40-50% |
| 2 | B, J, P, W | 1230 | 865 | 620 | No | | No | | | 40-50% |
| 3 | C, K, Q, X | 1230 | 874 | 620 | No | | No | | | 40-50% |
| 4 | D, L, R, Y | 1230 | 872 | 580 | No | | No | | | 40-50% |
| 5 | E, Z | 1230 | 865 | 580 | No | | No | | | 40-50% |
| 6 | F, S, AA | 1230 | 874 | 580 | No | | No | | | 40-50% |
| 7 | G, M, T, BB | 1230 | 865 | 580 | No | | No | | | 40-50% |
| 8 | H, N, U, CC | 1230 | 890 | 700 | No | | No | | | 40-50% |
| 9 | DD | 1250 | 913 | 609 | No | | No | | | 45% |
| 9 | EE | 1250 | 916 | 679 | 560 | 60 | No | | | 45% |
| 9 | FF | 1250 | 909 | 571 | 560 | 60 | No | | | 55% |
| 9 | GG | 1250 | 943 | 737 | No | | Yes | 648 | 0.2 | 45% |
| 10 | HH | 1250 | 904 | 636 | 560 | 60 | No | | | 45% |
| 10 | II | 1250 | 905 | 566 | 560 | 60 | No | | | 45% |
| 11 | JJ | 1250 | 906 | 722 | 560 | 60 | No | | | 45% |
| 11 | KK | 1250 | 907 | 569 | 560 | 60 | No | | | 45% |
| 12 | XA | 1250 | 898 | 676 | No | | No | | | 45% |
| 13 | XB | 1250 | 880 | 650 | No | | No | | | 45% |
| 14 | XC | 1250 | 930 | 700 | 560 | 60 | No | | | 45% |

The effects of intermediate annealing $T_{IA}$ and of the cover treatment were assessed on the final product, i.e. after cold rolling, annealing and final coating. In comparison to the example DD that has not undergone intermediate annealing, the example EE was intermediately annealed; its microstructure was homogenized during this process. After the cold rolling and final coating process, the thickness variation along the coil length was below 5%, while the thickness variation along the coil length in the example DD was significantly higher.

Example GG was treated inside a cover device that made the hot rolled steel to cool much slower, which also improved the microstructure homogeneity inside the steel. Consequently, its final product thickness variation was also below 5%.

In table 3 below, all steels have undergone an oxidation during heating using a direct fire furnace followed by a reduction in a radiant tube furnace according to the present invention. Consequently, the steel sheets are suitable for receiving a GI or GA coating, since their surface does not include iron oxide layer, but an internal oxidized zone, with a depth between 200 nm and 100 μm, comprising one or more of Si, Mn, Al, Ti containing oxides, which corresponds to the alloying of the coating to the substrate. The cooling from the GA temperature down to room temperature after galvannealing has been carried out at 5° C./s.

TABLE 3 annealing parameters to produce hot dip coated very high strength steels

| Steel number | Fabrication condition | DFF temperature (° C.) | excess oxygen (%) | heating rate, (° C./s) | Dew point, (° C.) | AT, (° C.) | At. (s) | OAT, (° C.) | OAt, (s) | coating-type galvannealing temp. |
|---|---|---|---|---|---|---|---|---|---|---|
| 1 | A | 621 | n.m. | 1 | n.m. | 775 | 135 | 460-470 | 40 | GA-570° C. |
| 2 | B | | | | | | | | | |
| 3 | C | | | | | | | | | |
| 4 | D | | | | | | | | | |
| 5 | E | | | | | | | | | |
| 6 | F | | | | | | | | | |
| 7 | G | | | | | | | | | |
| 8 | H | | | | | | | | | |
| 1 | I | 621 | n.m. | 1.1 | n.m. | 800 | 135 | 460-470 | 40 | GA-570° C. |
| 2 | J | | | | | | | | | |
| 3 | K | | | | | | | | | |
| 4 | L | | | | | | | | | |
| 7 | M | | | | | | | | | |
| 8 | N | | | | | | | | | |
| 1 | O | 621 | n.m. | 1.3 | n.m. | 825 | 135 | 460-470 | 40 | GA-570° C. |
| 2 | P | | | | | | | | | |
| 3 | Q | | | | | | | | | |
| 4 | R | | | | | | | | | |
| 6 | S | | | | | | | | | |
| 7 | T | | | | | | | | | |
| 8 | U | | | | | | | | | |
| 1 | V | 621 | n.m. | 1.4 | n.m. | 850 | 135 | 460-470 | 40 | GA-570° C. |
| 2 | W | | | | | | | | | |
| 3 | X | | | | | | | | | |
| 4 | Y | | | | | | | | | |
| 5 | Z | | | | | | | | | |
| 6 | AA | | | | | | | | | |
| 7 | BB | | | | | | | | | |
| 8 | CC | | | | | | | | | |
| 9 | DD | 652 | 1.5 | 1.2 | −48 | 817 | 137 | 470 | 42 | GA-590° C. |
| 9 | EE | 676 | 1.5 | 1.5 | −24 | 843 | 132 | 460 | 41 | GA-629° C. |
| 9 | FF | 689 | 1.5 | 0.9 | 14 | 856 | 214 | 458 | 65 | GA-580° C. |
| 9 | GG | 712 | 1.5 | 1.4 | −42 | 844 | 134 | 470 | 41 | GA-579° C. |
| 10 | HH | 671 | 1.5 | 1.1 | 4 | 843 | 181 | 465 | 54 | GA-615° C. |
| 10 | II | 651 | 1.5 | 1.8 | −25 | 844 | 106 | 462 | 32 | GI |
| 11 | JJ | 683 | 1.5 | 0.9 | 7 | 848 | 206 | 445 | 63 | GA-526° C. |
| 11 | KK | 649 | 1.5 | 1.9 | −41 | 843 | 103 | 460 | 31 | GI |
| 12 | XA | 622 | 1.5 | 1.2 | <u>28</u> | 804 | 132 | 465 | 40 | GA-522 C. |
| 13 | XB | 595 | 1.5 | 1.0 | 0 | 805 | 163 | 465 | 50 | GA-522 C. |
| 14 | XC | 715 | 1.5 | 0.6 | 10 | 815 | 184 | 470 | 56 | GA-585 C. | n.m: not measured.
Underlined: outside the scope of invention

With regard to the microstructure, the mean values for selected examples table 3 have the following microstructural features:

TABLE 4 microstructural features

| Steel number | Fabrication condition | Bainite + Ferrite surface fraction (%) | martensite surface fraction (%) | Ferrite mean grain size (μm) | Ferrite aspect ratio | Internally oxidized depth (μm) |
|---|---|---|---|---|---|---|
| 8 | N | 24 | 76 | 1.4 | 1.8 | n.m. |
| 1 | O | 50 | 50 | 2.5 | 1.8 | n.m. |
| 3 | Q | 25 | 75 | 1.7 | 1.8 | n.m. |
| 4 | R | 49 | 51 | 2 | 1.7 | n.m. |
| 6 | S | 23 | 77 | 2.1 | 1.7 | n.m. |
| 7 | T | 35 | 65 | 1.6 | 1.7 | n.m. |
| 2 | W | 7 | 93 | 2 | 1.9 | n.m. |
| 5 | Z | 49 | 51 | 1.1 | 1.8 | n.m. |
| 9 | DD | 36 | 64 | 1.4 | 1.9 | 2 |
| 9 | EE | 30 | 70 | 2 | 1.9 | 3 |
| 9 | FF | 28 | 72 | 1.4 | 1.9 | 7 |
| 9 | GG | 36 | 64 | 1.6 | 1.8 | 3 |
| 10 | HH | 27 | 73 | 1.3 | 2.1 | 7 |
| 10 | II | 20 | 80 | 1.3 | 2 | 2 |
| 11 | JJ | 30 | 70 | 1.6 | 1.9 | n.m. |
| 11 | KK | 23 | 77 | 1.2 | 1.9 | 2 |
| 12 | XA | 49 | 51 | 1.2 | 1.9 | 5 |
| 13 | XB | <u>65</u> | <u>35</u> | 3.2 | 2.1 | <u>0</u> |
| 14 | XC | 50 | 50 | 2.1 | 2.2 | 10 |

Underlined values: outside of the invention

As for the mechanical properties, the table 5 shows the results for yield strength, tensile strength, total elongation and hole expansion. BOG stands for broken on gauge, the value has not been obtained.

TABLE 5 mechanical properties

| Steel number | Fabrication condition | YS (MPa) | TS (MPa) | TE (%) | HE (%) |
|---|---|---|---|---|---|
| 1 | A | 686 | 1193 | 12.2 | n.m. |
| 2 | B | 697 | 1193 | 12.9 | n.m. |
| 3 | C | 596 | 1167 | 11.7 | n.m. |
| 8 | H | 770 | 1133 | 12.6 | n.m. |
| 1 | I | 681 | 1147 | 9.7 | n.m. |
| 2 | J | 795 | 1262 | 8.3 | n.m. |
| 3 | K | 723 | 1249 | 13.8 | n.m. |
| 4 | L | 654 | 1147 | 10.6 | n.m. |
| 7 | M | 719 | 1273 | 9.7 | n.m. |
| 8 | N | 833 | 1181 | 8.9 | n.m. |
| 1 | O | 698 | 1111 | 8.9 | n.m. |
| 2 | P | 783 | 1253 | 10.1 | n.m. |
| 3 | Q | 826 | 1294 | 12.3 | 37 |
| 4 | R | 626 | 1066 | 11.7 | n.m. |
| 6 | S | 609 | 1066 | BOG | n.m. |
| 7 | T | 868 | 1315 | 10.7 | n.m. |
| 8 | U | 661 | 1177 | 10.5 | n.m. |
| 1 | V | 733 | 1138 | 8.8 | n.m. |
| 2 | W | 842 | 1266 | 8.7 | 57 |
| 3 | X | 877 | 1264 | 11.7 | n.m. |
| 4 | Y | 641 | 1084 | 12.6 | n.m. |
| 5 | Z | 624 | 1101 | BOG | n.m. |
| 6 | AA | 960 | 1357 | 8.2 | n.m. |
| 7 | BB | 640 | 1085 | 9.6 | n.m. |
| 9 | DD | 770 | 1219 | 10.7 | 21 |
| 9 | EE | 836 | 1259 | 9.1 | 21 |
| 9 | FF | 892 | 1236 | 9.9 | 20 |
| 9 | GG | 851 | 1180 | 8.0 | n.m. |
| 10 | HH | 949 | 1316 | 10.2 | n.m. |
| 10 | II | 827 | 1238 | 8.5 | n.m. |
| 11 | JJ | 876 | 1246 | 10.1 | 25 |
| 11 | KK | 842 | 1248 | 8.6 | n.m. |
| 12 | XA | 652 | <u>977</u> | 16.5 | 20 |
| 13 | XB | <u>351</u> | <u>599</u> | 27.3 | n.m. |
| 14 | XC | 651 | 1269 | <u>4.1</u> | <10 | n.m.: not measured.
Underlined: outside of the invention

The steels according to the invention present good coatability. In addition, a lot of examples show tensile strength above 980 MPa and even above 1180 MPa (see example W). Furthermore ductility levels are also above 8% in all cases corresponding to the invention, yield strength is above 500 MPa and even above 780 MPa in some examples (see example W) and hole expansion values are clearly above 20% and in the best cases above 40% (see example W).

Example XA was processed with dew point at 28° C. which was higher than 25° C. The steel tensile strength was below 980 MPa due to excessive decarburization caused by too high dew point in the furnace.

The steel of example XB has 1.8% Mn, which is lower than 2%. The coated sheet obtained at the end of the process contains 65% of ferrite plus bainite, which consequently results in a tensile strength much lower than 980 MPa.

The steel of example XC has more than 0.15% C, more than 1.5% Si and more than 0.1% Al, which made the martensite very hard in the steel. Consequently, the total elongation was much lower than 8% and the hole expansion ratio was much lower than 20%.

The steel according to the invention can be used for automotive body in white parts for motor vehicles.

What is claimed is:
1. A method for producing a cold rolled and hot dip coated steel sheet comprising the following successive steps:
   casting a steel so as to obtain a slab, the steel having a composition consisting of, by weight percent:

0.05% ≤ C ≤ 0.15%;
2% ≤ Mn ≤ 3%;
Al ≤ 0.1%;
0.3% ≤ Si ≤ 1.5%;
0.01% ≤ Nb ≤ 0.05%;
N ≤ 0.02%;
0.1% ≤ Cr+Mo ≤ 1%;
0.0001% ≤ B < 0.0025%;
Ti ≤ 0.5%;
V < 0.01%;
S ≤ 0.01%;
P ≤ 0.05%; and
a remainder of the composition being iron and unavoidable impurities resulting from a smelting;
reheating the slab at a temperature $T_{reheat}$ above 1180° C.;
hot rolling the reheated slab at a temperature above 800° C. to obtain a hot rolled steel;
cooling the hot rolled steel until a coiling temperature $T_{coiling}$ between 500° C. and 800° C.; then
coiling the hot rolled steel cooled at $T_{coiling}$;
de-scaling the hot rolled steel;
cold rolling the hot rolled steel so as to obtain a cold rolled steel sheet, with a cold rolling reduction ratio between 40 and 60%;
annealing the cold rolled steel sheet comprising the steps of:
heating the cold rolled steel sheet to a direct fire furnace temperature in a direct fire furnace having an atmosphere with an excess oxygen volume percentage between 0.2% and 4%, wherein an oxidizing step takes place between 500° C. and 750° C., a layer of iron oxide being formed on the surface of the cold rolled steel sheet while an internal oxidation occurs under the iron oxide layer;
heating up from the direct fire furnace temperature to an annealing temperature in a radiation tube furnace, with a heating rate between 0.5 and 2.5° C./s, the radiation tube furnace having an atmosphere with a dew point below or equal to 25° C.;
the annealing temperature $T_{anneal}$ being between 750 and 950° C.;
maintaining the cold rolled steel sheet at the annealing temperature $T_{anneal}$ for a duration from 30 seconds to 300 seconds;
cooling the cold rolled steel sheet to a temperature $M_A$ between 440° C. and 470° C.;
holding the cold rolled steel sheet at $T_{OA}$ for more than 30 seconds and less than 180 seconds;
during said heating, maintaining at $T_{anneal}$ and cooling steps, the surface of the cold rolled steel sheet being oxidized and subsequently reduced, the layer of iron oxide being fully reduced, so as to obtain an internally oxidized depth of at least 200 nm and of less than 100 μm, comprising one or more of Si, Mn, Al, Ti containing oxides;
hot dip coating the cold rolled steel sheet to obtain a cold rolled and hot dip coated steel sheet; and
cooling the cold-rolled and hot dip coated steel sheet down to room temperature at a cooling rate of at least 1° C./s.

2. The method according to claim 1, wherein after hot dip coating, the cold rolled and hot dip coated steel sheet is galvannealed to reach an iron content between 7% and 15% in the coating.

3. The method according to claim 1, wherein 500° C. ≤ $T_{coiling}$ ≤ 750° C.

4. The method according to claim 1, after the de-scaling and before the cold-rolling, further comprising the step of:
annealing the hot rolled steel at a temperature $T_{IA}$ above 300° C. for more than 20 minutes.

5. The method according to claim 4, wherein the hot rolled steel is annealed at the temperature $T_{IA}$ such that 500° C. ≤ $T_{IA}$ ≤ 650° C. for a time between 30 hours and 100 hours.

6. The method according to claim 4, after the annealing at the temperature $T_{IA}$ and before the cold-rolling, further comprising the steps of:
placing the hot rolled steel a cover, the hot rolled steel having a temperature before entering the cover of above 400° C.;
cooling the hot rolled steel under the cover with a cooling rate less than or equal to 1° C./min and greater than or equal to 0.01° C./min.

7. The method according to claim 1, wherein the radiant tube furnace has a mixed gas atmosphere having a dew point below 0° C. and a surface of the cold rolled steel sheet is reduced within the radiant tube.

8. The method according to claim 1, wherein 775° C. ≤ $T_{anneal}$ ≤ 860° C.

9. The method according to claim 1, wherein the hot dip coating is done in a liquid Zn bath so as to obtain a galvanized or galvannealed cold rolled and hot dip coated steel sheet.

10. The method according to claim 1, wherein
the cold-rolled and hot dip coated steel sheet has a microstructure consisting of, in surface fraction:
between 50 and 95% of martensite; and
between 5 and 50% of a sum of ferrite and bainite;
the ferrite having an average grain size lower than 10 μm, ferrite grains having an aspect ratio between 1 and 3; and
an internally oxidized depth of at least 200 nm and of less than 100 μm, comprising one or more of Si, Mn, Al, Ti containing oxides, is present under the hot dip coating.

11. The method according to claim 1, wherein 0.09% ≤ C ≤ 0.14%.

12. The method according to claim 1, wherein 2.2% ≤ Mn ≤ 2.7%.

13. The method according to claim 1, wherein Al ≤ 0.05%.

14. The method according to claim 1, wherein 0.6% < Si ≤ 1.3%.

15. The method according to claim 1, wherein Nb ≤ 0.03%.

16. The method according to claim 1, wherein 0.1% ≤ Cr+Mo ≤ 0.7%.

17. The method according to claim 1, wherein 0.001% ≤ B ≤ 0.0022%.

18. The method according to claim 1, wherein 0.02% ≤ Ti ≤ 0.05%.

19. The method according to claim 1, wherein a surface fraction of the sum of ferrite and bainite is between 20% and 40% and a ferrite average grain size is below 3 μm.

20. The method according to claim 1, wherein the cold rolled and hot dip coated steel sheet has a tensile strength of at least 980 MPa, a yield strength of at least 500 MPa, a total elongation of at least 8% and a hole expansion of at least 20%.

21. The method according to claim 20, wherein the tensile strength is at least 1180 MPa, the yield strength is at least 780 MPa, the total elongation is at least 8% and the hole expansion is at least 20%.

* * * * *